March 18, 1947. P. G. LANGE 2,417,693
SEAL FOR RADIAL FLOW TURBINES OR COMPRESSORS
Filed July 16, 1945
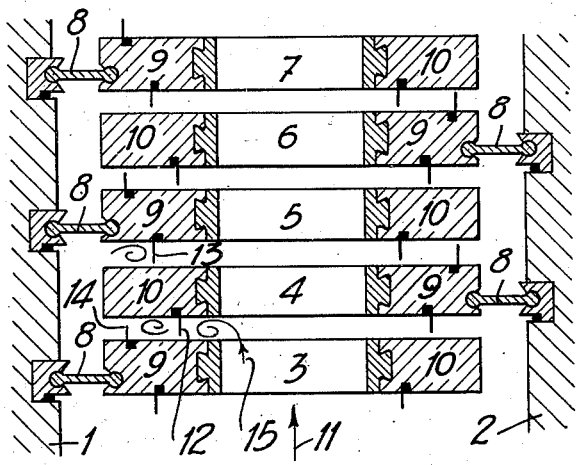
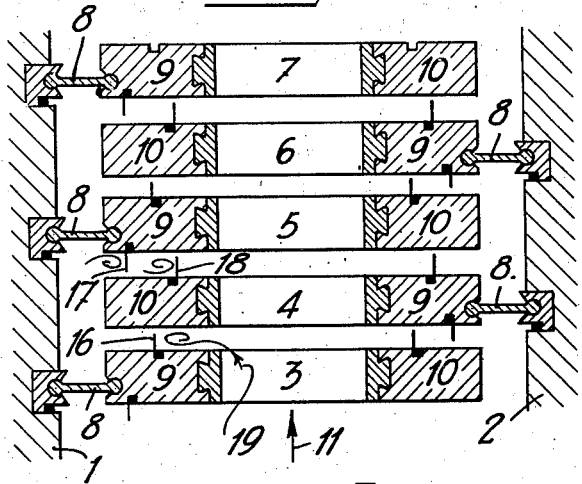
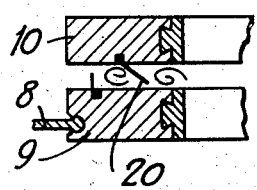
Inventor
Per G. Lange
by Sommers Young
Attorneys Patented Mar. 18, 1947

2,417,693

UNITED STATES PATENT OFFICE 2,417,693

SEAL FOR RADIAL FLOW TURBINES OR COMPRESSORS

Per Gottfrid Lange, Finspong, Sweden

Application July 16, 1945, Serial No. 605,374
In Sweden October 23, 1944

4 Claims. (Cl. 253—16.5)

This invention relates to radial flow elastic fluid turbines or compressors having unilaterally supported blade rings and in which every other blade ring is adapted to rotate in a given direction while the remaining blade rings may either be stationary to act merely as guide blade rings or adapted to rotate in the opposite direction. In both of these types of bladings it is well-known to prevent leakage of elastic fluid around the unsupported ring bonds of the blade rings by means of tightening strips providing throttling points in the way of the leaking fluid.

In mounting and dismantling such a blading it is common practice to displace the two halves of the blading axially with relation to each other so as to cause the blade rings of one half to enter into between those of the other half or to withdraw them therefrom. It is a condition for this operation that the tightening strips should be so arranged as not to interfere with said displacement of adjacent blade rings with relation to each other.

The invention has for its object to provide a special arrangement of the tightening strips which while satisfying said condition yields a better tightening effect than the tightening devices hitherto known.

The invention is characterized, chiefly, by the fact that the two spaces on opposite sides of said unsupported ring bonds are provided with three tightening strips or groups of tightening strips altogether, the first and last ones as reckoned in the direction of flow of the leaking fluid being fastened to surfaces of the respective ring bonds facing in one and the same direction, whereas the intermediate strip or group of strips is fastened to a surface of a third ring bond facing in the opposite direction.

In the accompanying drawing three embodiments of the invention are illustrated in Figs. 1, 2 and 3, respectively. Figs. 1 and 2 are axial sections of a number of blade rings, while Fig. 3 is an axial section of parts of a pair of blade rings.

In Figs. 1 and 2, the reference numerals 1 and 2 designate two discs of a radial flow elastic fluid turbine or compressor, in which one disc is rotating and the other either rotating in the opposite direction or stationary. Inserted between discs 1 and 2 is a set of blade rings 3 to 7, those numbered 3, 5 and 7 being fastened to disc 1 by means of expansion rings 8 and those numbered 4 and 6 being similarly fastened to disc 2. The ring bonds of the blade rings engaged by the expansion rings are designated by the reference numeral 9 while the unsupported, or overhung, ring bonds are designated by the reference numeral 10. The direction of flow of the fluid adapted to expand or to be compressed in the blading, as the case may be, is indicated by the arrow 11. Inserted into grooves in the supported and unsupported ring bonds and sealed therein by means of caulking wires in well known way are the tightening strips to be hereinafter described.

In the embodiment shown in Fig. 1 the spaces on opposite, that is to say, inner and outer, sides of each unsupported ring bond 10 contain three tightening strips altogether. Of said strips the first one as reckoned in the direction of flow of the leaking fluid, which is designated by the reference numeral 12 and the last one which is designated by the reference numeral 13, are fastened to equally facing surfaces of the respective ring bonds 10 and 9, whereas the remaining, or intermediate, tightening strip 14 is fastened to an oppositely facing surface of the supported ring bond 9 situated inside the unsupported ring bond 10 next thereto. As shown, the tightening strips 12 and 13 are pointing inwards, and the tightening strip 14 is pointing outwards.

The arrangement above described yields a good tightening effect while maintaining the mounting and dismantling facilities unimpaired. As will appear from the line of flow 15, the leaking fluid passing along the inside of each unsupported ring bond 10 is caused by the tightening strip 12 to change its direction of flow with a resulting formation of whirls which act to suppress the leakage. The tightening strip 14 again causes the leaking fluid to change its direction with resulting further whirls. The leaking fluid escaping at the free edge of the tightening strip 14 passes outwards along the end surface of the unsupported ring bond 10 and thence enters the space outside thereof, where it strikes the tightening strip 13 and is caused to again change its direction of flow and produce whirls.

The embodiment shown in Fig. 2 differs from that above described by the fact that the tightening strip adapted to be first passed by the leaking fluid is pointing outwards, as shown at 16, while the second one is pointing inwards, as shown at 17, and the third is again pointing outwards, as shown at 18. Consequently, in this case it is the third tightening strip 18 that is carried by the unsupported ring bond 10. As indicated by the lines of flow 19, the tightening strips will cause changes of the direction of flow of the leaking fluid also in this case with resulting formation of leakage suppressing whirls.

In order to obtain an increased throttling effect at each throttling point the tightening strips may be arranged in an inclined position with relation to the direction of flow of the leaking fluid, as shown at 20 in Fig. 3, where the inclined tightening strip shown forms a pocket acting to catch the leaking fluid.

Instead of single tightening strips, as shown at 12, 13, 14 in Fig. 1 or 16, 17, 18 in Fig. 2, groups of strips may be provided, each group comprising, for instance, two strips. In this case the various groups may be arranged and positioned in the same way as above described with reference to single strips.

What I claim is:

1. In a blading for a radial flow elastic fluid turbine or compressor, which comprises a set of blade rings concentrically arranged so as to form radial spaces between themselves, a ring bond at either end of each blade ring, means to support the ring bond of every second blade ring at one side of the blading, and means to support the ring bonds of the other blade rings at the other side of the blading, while forming at each side of the blading a set of annular chambers each of which connects the two spaces inside and outside an unsupported ring bond with each other, the provision in each such pair of interconnected spaces of two equally directed tightening strips or groups of strips and an oppositely directed tightening strip or group of strips, said last-mentioned strip or group of strips being positioned between the said two first-mentioned strips or groups of strips as far as the direction of flow of fluid passing from one space to another via the respective annular chamber is concerned.

2. A blading for a radial flow elastic fluid turbine or compressor as claimed in claim 1, and in which the equally directed tightening strips or groups of tightening strips of each pair of interconnected spaces are fastened to the inner surface of the unsupported ring bond and the inner surface of the supported ring bond of larger diameter respectively, whereas the oppositely directed tightening strip or group of strips is fastened to the outer surface of the supported ring bond of smaller diameter, said last-mentioned strip or group of strips being positioned at a greater axial distance from the center of the blading than the strip or strips fastened to the outer bounding surface of the respective space.

3. A radial flow elastic fluid turbine or compressor as claimed in claim 1, and in which said equally directed tightening strips or groups of tightening strips are fastened to the outer surface of a supported ring bond of smaller diameter and the outer surface of the adjacent unsupported ring bond of larger diameter, respectively, whereas the said oppositely directed strip or group of strips is fastened to the inner surface of the supported ring bond of larger diameter, said last-mentioned strip or group of strips being positioned at a greater axial distance from the center of the blading than the strip or strips fastened to the inner bounding surface of the respective space.

4. A tightening device as claimed in claim 1, characterized by the fact that all the tightening strips or some of them are arranged in an inclined position with relation to the flow of the leaking fluid (Fig. 3).

PER GOTTFRID LANGE.

REFERENCES CITED

The following references are of record in the file of this patent:

UNITED STATES PATENTS

| Number | Name | Date |
|---|---|---|
| 1,897,989 | Lysholm | Feb. 14, 1933 |

FOREIGN PATENTS

| Number | Country | Date |
|---|---|---|
| 503,066 | British | Mar. 30, 1939 |
| 11,358 | Netherlands | Apr. 16, 1924 |